US012614387B2

(12) United States Patent
Xu et al.

(10) Patent No.:  US 12,614,387 B2
(45) Date of Patent:        Apr. 28, 2026

(54) VIDEO SEGMENT RECOGNITION

(71) Applicant: SHANGHAI HODE INFORMATION TECHNOLOGY CO., LTD., Shanghai (CN)

(72) Inventors: Baohan Xu, Shanghai (CN); Peiyi Li, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 383 days.

(21) Appl. No.: 18/300,310

(22) Filed: Apr. 13, 2023

(65) Prior Publication Data

US 2023/0252785 A1      Aug. 10, 2023

Related U.S. Application Data

(63) Continuation of application No. PCT/CN2021/120383, filed on Sep. 24, 2021.

(30) Foreign Application Priority Data

Dec. 22, 2020    (CN) .......................... 202011531808.4

(51) Int. Cl.
*G06V 20/40*              (2022.01)
*G06V 10/80*              (2022.01)

(52) U.S. Cl.
CPC ............ *G06V 20/46* (2022.01); *G06V 10/806* (2022.01); *G06V 20/49* (2022.01)

(58) Field of Classification Search
CPC ....... G06V 20/46; G06V 20/49; G06V 10/806
See application file for complete search history.

(56) References Cited

U.S. PATENT DOCUMENTS

2002/0093591 A1*    7/2002    Gong ................. H04N 21/2368
                                                          348/E7.063
2008/0193016 A1      8/2008    Lim et al.
(Continued)

FOREIGN PATENT DOCUMENTS

CN          103631932 A        3/2014
CN          108229302 A        6/2018
(Continued)

OTHER PUBLICATIONS

Int'l Search Report for related application, PCT/CN2021/120383, issued Dec. 21, 2021, 7 pages.
(Continued)

*Primary Examiner* — Casey L Kretzer
(74) *Attorney, Agent, or Firm* — FisherBroyles, LLP

(57)                    ABSTRACT

A video processing method and apparatus is provided, the video processing method includes: dividing a received initial video into at least one video segment; obtaining, based on a feature extraction model, a first modal feature, a second modal feature, and a third modal feature that correspond to each video segment in the at least one video segment; and inputting, into a recognition model, the first modal feature, the second modal feature, and the third modal feature that correspond to each video segment, to obtain a video score corresponding to each video segment, and determining a target video segment in the initial video based on the video score.

16 Claims, 5 Drawing Sheets

(56) References Cited

U.S. PATENT DOCUMENTS

| | | | | |
|---|---|---|---|---|
| 2010/0118033 | A1 | 5/2010 | Faria | |
| 2014/0328570 | A1* | 11/2014 | Cheng | G06F 16/43 |
| | | | | 386/241 |
| 2017/0185846 | A1* | 6/2017 | Hwangbo | G06V 20/49 |
| 2019/0057314 | A1* | 2/2019 | Julian | H04L 67/34 |
| 2019/0377956 | A1* | 12/2019 | Zheng | G06V 20/40 |

FOREIGN PATENT DOCUMENTS

| | | | |
|---|---|---|---|
| CN | 108833973 | A | 11/2018 |
| CN | 109089133 | A | 12/2018 |
| CN | 109691124 | A | 4/2019 |
| CN | 110191357 | A | 8/2019 |
| CN | 110263220 | A | 9/2019 |
| CN | 110267119 | A | 9/2019 |
| CN | 110609955 | A | 12/2019 |
| CN | 111460219 | A | 7/2020 |
| CN | 111581437 | A | 8/2020 |
| CN | 111787354 | A | 10/2020 |
| CN | 111787356 | A | 10/2020 |
| CN | 112069951 | A | 12/2020 |
| CN | 112738557 | A | 4/2021 |
| WO | 20200215962 | A1 | 10/2020 |

OTHER PUBLICATIONS

First Office Action issued in counterpart application, CN Appl. No. 202011531808.4, mailing date Mar. 22, 2022, 19 pages.
European Extended Search Report for related application, EP 21908699. 8, issued Feb. 2, 2024, 8 pages.

* cited by examiner

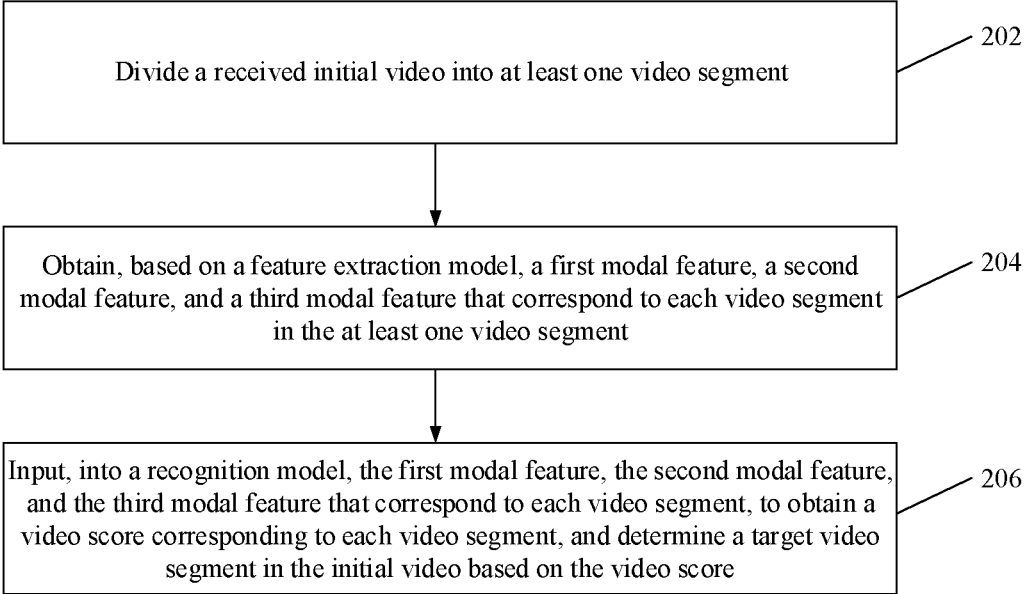

Divide a received initial video into at least one video segment  202

Obtain, based on a feature extraction model, a first modal feature, a second modal feature, and a third modal feature that correspond to each video segment in the at least one video segment  204

Input, into a recognition model, the first modal feature, the second modal feature, and the third modal feature that correspond to each video segment, to obtain a video score corresponding to each video segment, and determine a target video segment in the initial video based on the video score  206

FIG. 2

VIDEO SEGMENT RECOGNITION

CROSS-REFERENCE TO RELATED APPLICATIONS

This application is a continuation under 35 U.S.C. 111(a) of PCT International Application No. PCT/CN2021/120383, filed on Sep. 24, 2021, which claims priority to Chinese Patent Application No. 202011531808.4, filed on Dec. 22, 2020, the entire contents of which are hereby incorporated by reference in their entirety for all purposes.

TECHNICAL FIELD

This application relates to computer technologies, and in particular, to video processing.

BACKGROUND

With the development of the Internet, people have an increasing requirement for watching videos, perform livestreaming, and the like on a network platform. Video websites also have increasingly wide audiences. A user may watch various videos, and can interact with an online streamer or another person in real time. In this process, the user expects to know a highlight video segment (such as a brilliant segment) in a video and be capable of selecting, when watching livestreaming or another video, a video segment to which the user pays more attention. Many online streamers or video uploaders also expect to perform post editing on a highlight video segment in a livestreaming video after a very long time of livestreaming is completed. In addition, the video website also expects to more accurately recommend a video to more users by recognizing the highlight video segment.

SUMMARY

According to some embodiments of this application, a method is provided, including:

dividing a received initial video into at least one video segment;

obtaining, based on a feature extraction model, a first modal feature, a second modal feature, and a third modal feature that correspond to each video segment in the at least one video segment; and inputting, into a recognition model, the first modal feature, the second modal feature, and the third modal feature that correspond to each video segment, to obtain a video score corresponding to each video segment, and determining a target video segment in the initial video based on the video score.

According to some embodiments of this application, a computing device is provided, including a memory, a processor, and computer instructions stored in the memory and capable of running on the processor, where when executing the instructions, the processor perform operations of the above method.

According to some embodiments of this application, a non-transitory computer-readable storage medium is provided, the non-transitory computer-readable storage medium has computer program instructions stored thereon, wherein the computer program instructions, when executed by a processor, cause the processor to perform operations of the above method.

BRIEF DESCRIPTION OF DRAWINGS

FIG. 2 is a flowchart of a video processing method according to an embodiment of this application;

DETAILED DESCRIPTION OF EMBODIMENTS

Figure 1:
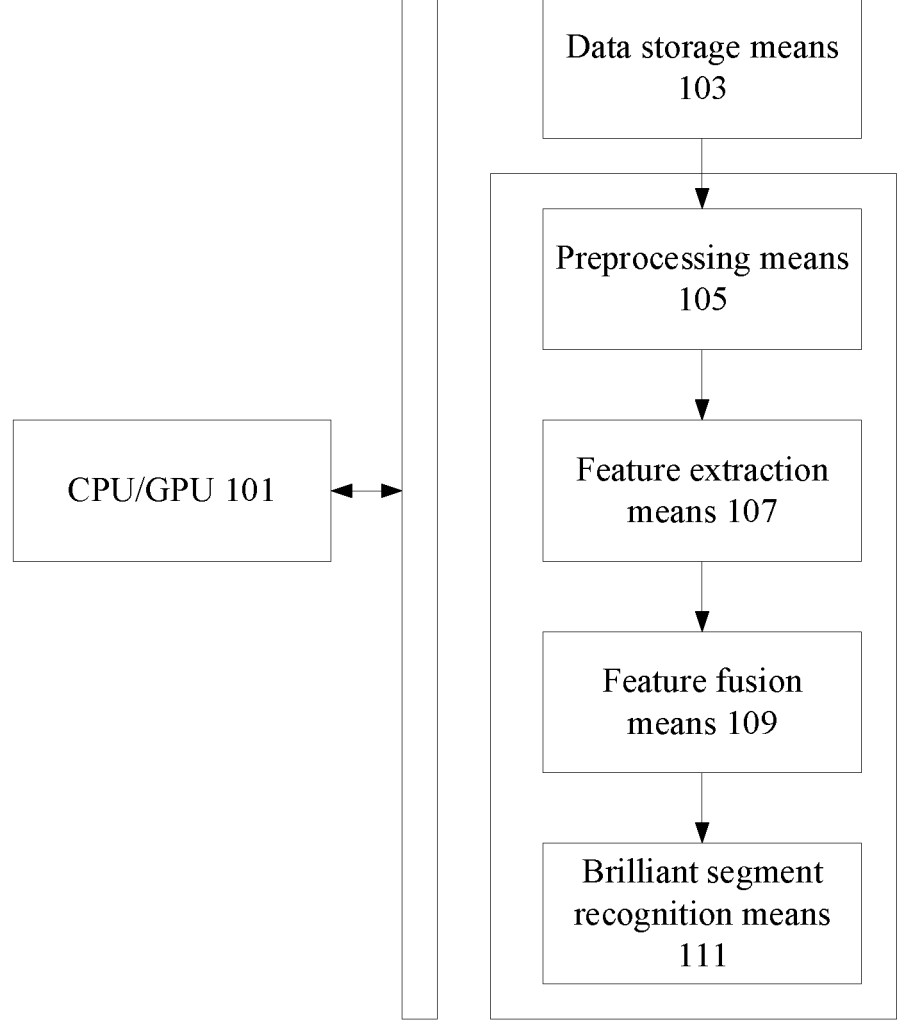
FIG. 1 is a schematic diagram of an application structure of a video processing method according to an embodiment of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should also be understood that, the term "and/or" used in one or more embodiments of this application indicates and includes any or all possible combinations of one or more associated listed items.

It should be understood that, although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained:

MFCC is short for Mel-frequency cepstral coefficient (MFCC).

VGGish is a VGG model based on TensorFlow, and is used to extract an audio data feature.

CNN is short for convolutional neural network (CNN).

MobileNet is a lightweight CNN neural network that focuses on a mobile device and an embedded device.

ResNet is a residual network, and is a deep CNN neural network.

Word2vec is a group of related models that are used to generate word vectors.

bert: is short for bidirectional encoder representations from transformers (BERT) and is an encoder of a bidirectional transformer.

GBDT is short for gradient boosting decision tree (GBDT).

Attention is an attention mechanism/model.

Highlight segment: Different standards may exist for different types of videos. For example, in a game video, the highlight segment may include a segment that an opponent is killed. In a competition video, the highlight segment may be a segment of achieving a score. In a live interaction video, the highlight segment may include some segments of inter-action between an online steamer and an audience. There-fore, picture information, audio information, interaction information, and the like are closely related to a highlight moment.

In the related art, accuracy of extracting the highlight video segment in the video is low, and a video segment that is greatly different from video content is easily extracted. Consequently, user experience is poor.

To resolve a technical defect in the related art that a highlight video segment in a video is not accurately extracted, this application provides a video processing method. This application also relates to a video processing apparatus, a computing device, and a computer-readable storage medium. The video processing method, the video processing apparatus, the computing device, and the com-puter-readable storage medium are described in detail in the following embodiments one by one.

FIG. 1 is a schematic diagram of an application structure of a video processing method according to an embodiment of this application.

The video processing method provided in this embodi-ment of this application is applied to a computer, a server, or a cloud service. An application scenario in FIG. 1 includes a central processing unit (CPU)/graphics processing unit (GPU) 101, a data storage means 103, a preprocessing means 105, a feature extraction means 107, a feature fusion means 109, and a brilliant segment recognition model 111. The CPU/GPU 101 starts to work to obtain a to-be-pro-cessed video stored in the data storage means 103. Then, the preprocessing means 105 is controlled to divide the to-be-processed video into a plurality of video segments and then input, into the feature extraction means 107, each video segment obtained through division, to extract a multi-modal feature of each video segment, for example, a speech fea-ture, a text feature, and an image feature. Subsequently, the plurality of modal features of each video segment that are extracted by the feature extraction means 107 are fused, to obtain an overall feature of each video segment. Finally, the overall feature of each video segment is input into the brilliant segment recognition means 109. A pre-trained model in the brilliant segment recognition means 109 scores each video segment, and obtains a video segment with a high score based on a score result of each video segment. The video segment with the high score is used as a brilliant segment to be displayed and recommended to a user, or is used to assist in subsequent video editing.

In this application, a multi-modal feature of the to-be-processed video is obtained to recognize a brilliant segment of the to-be-processed video, and the brilliant segment of the to-be-processed video is more comprehensively and accu-rately recognized based on the multi-modal and comprehen-sive video information.

FIG. 2 is a flowchart of a video processing method according to an embodiment of this application. The method includes the following steps.

Step 202: Divide a received initial video into at least one video segment.

The initial video may be a video of any type and with any duration, for example, the initial video may include an entertainment video, a news video, or a television episode video.

After receiving an initial video, a server may divide the received initial video into at least one video segment in a preset division manner. In actual application, the server may divide the initial video based on a quantity of video frames, preset division duration, and the like. For example, the initial video is divided into a plurality of video segments including 30 video frames. Alternatively, if the preset duration is 6 seconds, the initial video is divided into a plurality of video segments whose duration is 6 seconds. However, a manner of dividing the initial video includes but is not limited to the foregoing two manners, and may be set based on specific application. This is not limited in this application.

Step 204: Obtain, based on a feature extraction model, a first modal feature, a second modal feature, and a third modal feature that correspond to each video segment in the at least one video segment.

The first modal feature, the second modal feature, and the third modal feature are three different modal features.

After the initial video is divided into a plurality of video segments, each video segment is input into the feature extraction model to obtain the first modal feature, the second modal feature, and the third modal feature that correspond to each video segment. Subsequently, a brilliant video segment in the initial video may be more accurately recognized based on the three modal features. An exemplary implementation is as follows:

The obtaining, based on a feature extraction model, a first modal feature, a second modal feature, and a third modal feature that correspond to each video segment in the at least one video segment includes:

obtaining, based on a first feature extraction model, an audio feature corresponding to each video segment in the at least one video segment;

obtaining, based on a second feature extraction model, an image feature corresponding to each video segment in the at least one video segment; and obtaining, based on a third feature extraction model, a structured feature corresponding to each video segment in the at least one video segment.

Used feature extraction models vary with modals. When the first modal feature, the second modal feature, and the third modal feature are three different modal features, the first feature extraction model, the second feature extraction model, and the third feature extraction model are also three different feature extraction models.

For example, when the first modal feature is an audio feature, the first feature extraction model may be understood as an audio feature extraction model. When the second modal feature is an image feature, the second feature extrac-tion model may be understood as an image feature extraction model. When the third modal feature is a structured feature, the third feature extraction model may be understood as a structured feature extraction model.

In an implementation, each video segment is separately input into the audio feature extraction model, the image feature extraction model, and the structured feature extrac-tion model, so that the audio feature, the image feature, and the structured feature of each video segment can be obtained. Subsequently, the brilliant video segment in the initial video may be more accurately recognized based on a multi-modal feature such as the audio feature, the image feature, and the structured feature.

In some embodiments, the obtaining, based on a first feature extraction model, an audio feature corresponding to each video segment in the at least one video segment includes:

extracting audio information of each video segment in the at least one video segment; and inputting the audio information of each video segment into the first feature extraction model to obtain the audio feature corresponding to each video segment.

When the first modal feature is an audio feature, the audio information of each video segment is first extracted, and then the audio information is input into the first feature extraction model, so that the audio feature corresponding to the audio information of each video segment can be obtained.

When the first modal feature is an audio feature, the first feature extraction model may be an audio feature extraction model, for example, a pre-trained MFCC model or VGGish model.

In this application, the audio information of each video segment is extracted, and then the audio feature corresponding to the audio information of each video segment is accurately obtained based on the pre-trained audio feature extraction model. Subsequently, the accurate audio feature may be fused with another modal feature to obtain an accurate score of each video segment.

Optionally, the audio information includes audio information corresponding to a video picture and audio information corresponding to a non-video picture.

Correspondingly, the inputting the audio information of each video segment into the first feature extraction model to obtain the audio feature corresponding to each video segment includes:

inputting the audio information corresponding to the video picture in each video segment into the first feature extraction model to obtain an audio feature corresponding to the video picture in each video segment;

inputting the audio information corresponding to the non-video picture in each video segment into the first feature extraction model to obtain an audio feature corresponding to the non-video picture in each video segment; and fusing the audio feature corresponding to the video picture in each video segment and the audio feature corresponding to the non-video picture in each video segment, to obtain the audio feature corresponding to each video segment.

The audio information corresponding to the video picture may be understood as audio information corresponding to a main video picture, for example, sound of a game character in a game picture. The audio information corresponding to the non-video picture may be understood as audio information corresponding to a non-main video picture, for example, sound of a livestreaming narrator in a video, or audio of another small-window video in a video picture.

In actual application, if the initial video is a video in a livestreaming scenario, the initial video includes dubbing of a video picture, and may also include dubbing of a livestreaming narrator and the like. Therefore, each video segment obtained through division may include two types of audio information: the audio information corresponding to the video picture and the audio information corresponding to the non-video picture. For example, in a game livestreaming scenario, the audio information corresponding to the video picture may be understood as sound of a game character in a game picture, and the audio information corresponding to the non-video picture may be understood as game narration sound of a livestreaming narrator of a game.

In this case, to ensure accuracy of the audio feature of the audio information of each video segment, in actual application, audio features of the obtained two types of audio information of each video segment are separately extracted by using the first feature extraction model.

The audio information corresponding to the video picture in each video segment is input into the first feature extraction model to obtain a first audio feature corresponding to the video segment. Then, the audio information corresponding to the non-video picture in the video segment is input into the first feature extraction model to obtain an audio feature corresponding to the non-video picture in each video segment. Finally, the first audio feature and the audio feature corresponding to the non-video picture in each video segment are fused to obtain a final audio feature of the video segment. The first feature extraction model may be an audio feature extraction model, for example, a pre-trained MFCC model or VGGish model.

In actual application, the initial video may include only video dubbing, namely, the audio information corresponding to the video picture. In this case, only an audio feature of the video dubbing in each video segment needs to be extracted. If the initial video includes video dubbing and other extra dubbing, to ensure that the audio feature is completely and accurately extracted, audio features of the two types of audio information of each video segment need to be separately extracted and fused, to avoid feature disorder caused by simultaneously extracting the audio features.

According to some embodiments of the present application, in the video processing method, a first modal feature, a second modal feature, and a third modal feature of an obtained video are fused, and when a highlight video segment of the video is recognized based on a multi-modal feature obtained through fusion, the highlight video segment of the video is accurately obtained by using multi-modal and comprehensive feature information of the video, which improves user experience.

In some embodiments of this application, the obtaining, based on a second feature extraction model, an image feature corresponding to each video segment in the at least one video segment includes:

extracting image information of each video segment in the at least one video segment; and inputting the image information into the second feature extraction model to obtain the image feature corresponding to each video segment.

When the second modal feature is an image feature, the image information of each video segment is extracted, and then the image information is input into the second feature extraction model to obtain the image feature corresponding to the image information of each video segment.

When the second modal feature is an image feature, the second feature extraction model may be an image feature extraction model, for example, a pre-trained MobileNet model or ResNet model.

In this application, the image information of each video segment is extracted, and then the image feature corresponding to the image information of each video segment is accurately obtained based on the pre-trained image feature extraction model. Subsequently, the accurate image feature may be fused with another modal feature to obtain an accurate score of each video segment.

Optionally, the image information includes a video picture and a key area picture, and the second feature extraction model includes a first image feature extraction model and a second image feature extraction model.

Correspondingly, the inputting the image information into the second feature extraction model to obtain the image feature corresponding to each video segment includes:

inputting the video picture into the first image feature extraction model to obtain a first image feature corresponding to each video segment;

inputting the key area picture into the second image feature extraction model to obtain a second image feature corresponding to each video segment; and fusing the first image feature and the second image feature that correspond to each video segment, to obtain the image feature corresponding to each video segment.

In actual application, a video picture of the initial video may include but is not limited to key area information (for example, a score area and a kill area in a game video) and overall picture information of each video frame. Therefore, each video frame of each video segment obtained through division also includes the two types of image information.

In this case, to ensure comprehensiveness and accuracy of the image feature of the image information of each video segment, in actual application, for the obtained two types of image information of each video segment, different image feature extraction models are separately used to extract image features corresponding to the types of image information.

For example, an image feature of the overall picture information (namely, the video picture) of each video frame of each video segment is extracted by using a CNN model. An image feature of the key area information (namely, the key area picture) of each video frame of each video segment is extracted based on different types of videos and different image feature extraction models. For example, in a game score scenario, the image feature extraction model may be a score image feature extraction model, and a score feature of a score area of each video frame of each video segment is obtained by using the model.

In some embodiments, the video picture of each video segment is input into the first image feature extraction model to obtain the first image feature corresponding to the video segment. Then, the key area picture of the video segment is input into the second image feature extraction model to obtain the second image feature corresponding to the video segment. Finally, the first image feature and the second image feature are fused to obtain a final image feature of the video segment.

In actual application, the initial video may include only a video picture. In this case, only an image feature of a video picture of each video segment needs to be extracted. If the initial video includes video picture information and a key area picture corresponding to a field of the initial video, to ensure that the image feature is completely and accurately extracted, image features of the two types of image information of each video segment need to be separately extracted, to ensure integrity and comprehensiveness of the image feature of each video segment.

Optionally, the image information includes a video picture, a key area picture, and an online streamer image, and the second feature extraction model includes a first image feature extraction model, a second image feature extraction model, and a third image feature extraction model.

Correspondingly, the inputting the image information into the second feature extraction model to obtain the image feature corresponding to each video segment includes:

inputting the video picture into the first image feature extraction model to obtain a video picture feature corresponding to each video segment;

inputting the key area picture into the second image feature extraction model to obtain a key area picture feature corresponding to each video segment; and inputting the online streamer image into the third image feature extraction model to obtain an online streamer image feature corresponding to each video segment; and fusing the video picture feature, the key area picture feature, and the online streamer image feature that correspond to each video segment, to obtain the image feature corresponding to each video segment.

In actual application, if the initial video is a video in a livestreaming scenario, the initial video includes a video picture and a key area picture related to a field of the initial video, and may also include a face image of a livestreaming narrator and the like. Therefore, each video segment obtained through division also includes the three types of image information: the video picture, the key area picture, and the online streamer image.

In this case, to ensure comprehensiveness and accuracy of the image feature of the image information of each video segment, in actual application, for the obtained three types of image information of each video segment, different image feature extraction models are separately used to extract image features corresponding to the types of image information.

For example, an image feature of the overall picture information (namely, the video picture) of each video frame of each video segment is extracted by using a CNN model. An image feature of the key area information (namely, the key area picture) of each video frame of each video segment is extracted based on different types of videos and different image feature extraction models. For example, in a game score scenario, the image feature extraction model may be a score image feature extraction model, and a score feature of a score area of each video frame of each video segment is obtained by using the model. An image feature of face information (namely, the online streamer image) of a livestreaming narrator of each video frame of each video segment may be extracted based on a convolutional neural network that is pre-trained by using facial emotion.

In some embodiments, the video picture of each video segment is input into the first image feature extraction model to obtain the video picture feature corresponding to the video segment. Then, the key area picture of the video segment is input into the second image feature extraction model to obtain the key area picture feature corresponding to the video segment. Subsequently, the online streamer image is input into the third image feature extraction model to obtain the online streamer image feature corresponding to the video segment. Finally, the video picture feature, the key area picture feature, and the online streamer image feature are fused to obtain a final image feature of the video segment.

In actual application, the initial video may include only video picture information. In this case, only an image feature of a video picture of each video segment needs to be extracted. If the initial video includes a video picture and a key area picture corresponding to a field of the initial video, to ensure that the image feature is completely and accurately extracted, image features of the two types of image information of each video segment need to be separately extracted, to ensure integrity and comprehensiveness of the image feature of each video segment. When the initial video includes a video picture, a key area picture corresponding to a field of the initial video, and a livestreaming narrator image, to ensure that the image feature is completely and accurately extracted, image features of the three types of image information of each video segment need to be separately extracted, to ensure integrity and comprehensiveness of the image feature of each video segment.

In some embodiments of this application, the obtaining, based on a third feature extraction model, a structured feature corresponding to each video segment in the at least one video segment includes:

extracting structured information of each video segment in the at least one video segment; and inputting the structured information into the third feature extraction model to obtain the structured feature corresponding to each video segment.

The structured information includes but is not limited to text information, numerical information, and the like, for example, a video title, comment information, and bullet-screen comment information in the initial video. If the initial video is a livestreaming video, the structured information may further include gift information, recharge information, a recharge amount, and the like.

The third modal feature may be understood as a structured feature. In this case, when the third modal feature is a structured feature, the structured information of each video segment is extracted, and then the structured information is input into the third feature extraction model to obtain the structured feature corresponding to the structured information of each video segment.

When the third modal feature is a structured feature, the third feature extraction model may be a structured feature extraction model, for example, a pre-trained Word2vec model or BERT model.

In this application, the structured information of each video segment is extracted, and then the structured feature corresponding to the structured information of each video segment is accurately obtained based on the pre-trained structured feature extraction model. Subsequently, the accurate structured feature may be fused with the audio feature and the image feature to obtain an accurate score of each video segment.

Step 206: Input, into a recognition model, the first modal feature, the second modal feature, and the third modal feature that correspond to each video segment, to obtain a video score corresponding to each video segment, and determine a target video segment in the initial video based on the video score.

In an implementation, the first modal feature (namely, the audio feature), the second modal feature (namely, the image feature), and the third modal feature (namely, the structured feature) that correspond to each video segment may be spliced to obtain a target video feature corresponding to each video segment. Then, the target video feature corresponding to each video segment is input into the recognition model to obtain the video score corresponding to each video segment. Alternatively, the first modal feature, the second modal feature, and the third modal feature that correspond to each video segment may be directly input into the recognition model, and after processing such as dimension reduction, normalization, and weighting is performed in the recognition model, the video score corresponding to each video segment is directly output.

The recognition model includes but is not limited to a GBDT model, an attention-based deep neural network model, and the like.

In actual application, a frequently-used feature fusion algorithm is provided in the GBDT model. Importance of an input feature may be recognized. Then, a score of a corresponding video segment is regressed by using marked training data. In the attention-based deep neural network model, training data is used to train distribution of importance of different modal features and regress a score of a video segment, to store a trained recognition model in a corresponding device. During specific use, an extracted multi-modal feature corresponding to the video segment is input into the recognition model, and the video score corresponding to the video segment may be directly output.

In some embodiments of this application, the determining a target video segment in the initial video based on the video score includes:

determining, as the target video segment in the initial video, a video segment whose video score is greater than or equal to a preset score threshold.

The preset score threshold may be set based on an actual requirement. This is not limited in this application. For example, the preset score threshold may be 80 points.

When the preset score threshold is 80 points, a video segment whose video score is greater than or equal to 80 points is determined as the target video segment in the initial video.

In actual application, the target video segment may be determined in another manner. For example, the video segments are sorted in descending order of video scores, and then the first three, four, or six video segments that rank top are selected as the target video segment.

In this application, after the video score of each video segment in the initial video is obtained, the target video segment in the initial video may be accurately obtained based on the video score of each video segment. Subsequently, video recommendation or video clip generation may be performed based on the target video segment.

In some embodiments, after the determining, as the target video segment in the initial video, a video segment whose video score is greater than or equal to a preset score threshold, the method further includes:

generating a target video based on the target video segment, and sending the target video to a user.

After the target video segment is obtained, the target video segment may be spliced to generate the target video. Because the video score of the target video segment is high, and the target video segment includes much content that attracts attention of a user, the target video segment is used to generate the target video, and the target video is sent to the user, so that a click-through rate and a view rate of the user for the target video can be increased. If an advertisement exists in the target video, an exposure rate of the advertisement may be further greatly increased.

In addition, used models may vary with scenarios to which the video processing method provided in this application is applied. For example, if the video processing method is applied to a livestreaming scenario with a high real-time requirement, a lightweight model may be used for the feature extraction model, the recognition model, and the like in the video processing method, to increase an overall processing speed of the video processing method. If the video processing method is applied to background processing, a complex deep learning model may be used for the feature extraction model, the recognition model, and the like in the video processing method, to ensure accuracy of the video processing method. An exemplary implementation is as follows:

The method further includes:

determining type information of the feature extraction model and/or the recognition model based on a scenario to which the video processing method is applied and/or a resource requirement of the video processing method.

For example, when the video processing method is applied to a real-time processing scenario (such as a livestreaming scenario) or the resource requirement of the video processing method is less than or equal to a preset resource threshold, a type of feature extraction model and/or recognition model (such as a lightweight initial feature extraction model and/or a recognition model) may be used. The preset resource threshold may be set based on an actual requirement. This is not limited in this application. When the video processing method is applied to a background processing scenario (for example, a scenario existing after livestreaming ends) or the resource requirement of the video processing method is greater than a preset resource threshold, another type of feature extraction model and/or recognition model may be used.

In actual application, in the real-time scenario, a type of a model is used for the audio feature, the image feature, the structured feature, feature fusion, and the like. In the background scenario, another type of model is used for the audio feature, the image feature, the structured feature, feature fusion, and the like. For details, refer to Table 1.

TABLE 1

| | Audio feature | Image feature | Structured feature | Feature fusion |
|---|---|---|---|---|
| Real-time processing scenario | MFCC | MobileNet | Word2vec | GBDT |
| Background processing scenario | VGGish | ResNet | BERT | Attention |

It may be learned from Table 1 that, when the video processing method is applied to the real-time processing scenario (for example, the livestreaming scenario) or the resource requirement of the video processing method is less than or equal to the preset resource threshold, the audio feature extraction model may be an MFCC model; or when the video processing method is applied to the background processing scenario (for example, the scenario existing after livestreaming ends) or the resource requirement of the video processing method is greater than the preset resource threshold, the audio feature extraction model may be a VGGish model. When the video processing method is applied to the real-time processing scenario (for example, the livestreaming scenario) or the resource requirement of the video processing method is less than or equal to the preset resource threshold, the image feature extraction model may be a MobileNet model; or when the video processing method is applied to the background processing scenario (for example, the scenario existing after livestreaming ends) or the resource requirement of the video processing method is greater than the preset resource threshold, the image feature extraction model may be a ResNet model. When the video processing method is applied to the real-time processing scenario (for example, the livestreaming scenario) or the resource requirement of the video processing method is less than or equal to the preset resource threshold, the structured feature extraction model may be a Word2vec model; or when the video processing method is applied to the background processing scenario (for example, the scenario existing after livestreaming ends) or the resource requirement of the video processing method is greater than the preset resource threshold, the structured feature extraction model may be a BERT model. When the video processing method is applied to the real-time processing scenario (for example, the livestreaming scenario) or the resource requirement of the video processing method is less than or equal to the preset resource threshold, the feature fusion model may be a GBDT model; or when the video processing method is applied to the background processing scenario (for example, the scenario existing after livestreaming ends) or the resource requirement of the video processing method is greater than the preset resource threshold, the feature fusion model may be an attention model.

In this application, in the video processing method, an audio feature, an image feature, and a structured feature of an obtained video are fused, and when a highlight video segment of the video is recognized based on a multi-modal feature obtained through fusion, the highlight video segment of the video is accurately obtained by using multi-modal and comprehensive feature information of the video. This improves user experience.

In the video processing method, feature fusion is performed by extracting different features of a plurality of pieces of audio information, a plurality of pieces of video information, and a plurality of pieces of structured information, so that a brilliance degree of each video segment of a current video is scored by fusing the features, to finally accurately and quickly recognized a highlight video segment of the video. In the video processing method, global information of the video may be obtained by fusing a plurality of modal features, to accurately obtain the highlight video segment of the video. In addition, in the method, different algorithm configuration and deployment may be performed for different application scenarios and/or resource requirements, to meet a requirement of a processing speed and accuracy of the video processing method.

Figure 3:
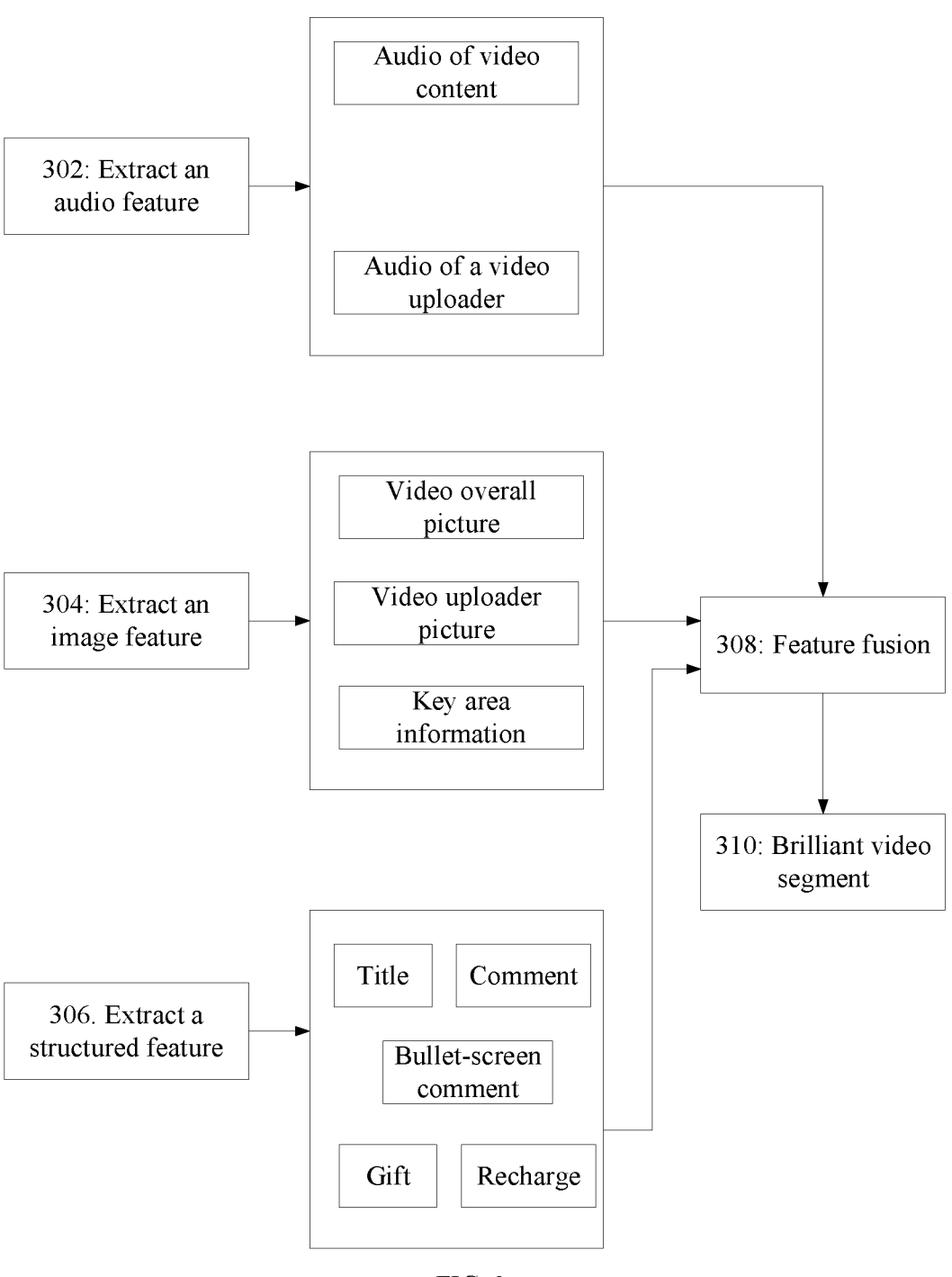
FIG. 3 is a processing flowchart of a video processing method applied to a livestreaming scenario according to an embodiment of this application.

FIG. 3 is a processing flowchart of a video processing method applied to a livestreaming scenario according to an embodiment of this application. The method includes the following steps.

Step 302: Extract audio from a livestreaming video to obtain an audio feature of the livestreaming video.

Audio of video content included in the livestreaming video and audio of a video uploader during livestreaming are extracted. If the livestreaming video does not include the audio of the video uploader, only the audio of the video content is extracted. Audio content is strongly associated with the video as a whole, and a highlight video segment of the video is generally accompanied by a high pitch of the video or increasing a volume, laughing, or the like by the video uploader. After the audio is extracted, a corresponding audio feature may be extracted by using a conventional audio feature such as MFCC, a volume, or a pitch, or a VGGish-based deep neural network. VGGish is a model that provides audio feature extraction after classification pre-training is performed by using a large amount of audio data.

Step 304: Extract a video image from the livestreaming video to obtain an image feature of the livestreaming video.

The video image includes a video overall picture, a video uploader picture, and key area information. The video overall picture includes a feature of the entire video, and a highlight moment is generally accompanied by a rich color, content, and the like. The video uploader picture mostly includes face information of the video uploader, and emotion expression and fluctuation are strongly associated with the highlight moment. The key area information is an area on which a user usually focuses. Generally, the highlight moment is also related to the key area. For example, in a game video, the user usually focuses on a score area and a kill prompt area. In a video such as a dance video, the user may usually focus on an area that includes a character in the center of a picture.

In this application, a video overall picture feature is extracted by using a convolutional neural network (CNN) pre-trained by the ImageNet. Feature extraction may be performed on video uploader picture information by using a convolutional neural network pre-trained based on facial emotion. A corresponding feature of the key area information is extracted by training different detectors based on different types of videos, for example, a score information feature, a kill information feature, and a human action information feature.

Step 306: Extract structured information from the livestreaming video to obtain a structured feature of the livestreaming video.

The video generally further includes much structured information, for example, information such as a title, a comment, and a bullet-screen comment. In the livestreaming video, the video further includes gift information, recharge information, and the like. The structured information is also related to the highlight moment, for example, comment content, bullet-screen comment content, a quantity of bullet-screen comments, and a quantity of gifts. For the structured information, this application proposes to extract a structured feature based on Word2vec or BERT for text such as a title, a comment, and a bullet-screen comment. In addition, numerical information such as a quantity of bullet-screen comments, a quantity of gifts, gift value, and a recharge amount may be normalized to a value that falls within [0, 1], and is also extracted as a feature of the structured information.

Step 308: Perform feature fusion on the audio feature, the image feature, and the structured feature of the livestreaming video.

After extraction of the multi-modal feature of the livestreaming video is completed, a feature-level fusion policy is used in this application. During feature fusion, features of each video segment are summarized, and after a dimension reduction operation and a normalization operation, feature fusion may be performed in a fusion manner such as a conventional gradient boosting decision tree (GBDT) or an attention-based deep neural network. A GBDT algorithm based on a plurality of decision trees is a frequently-used feature fusion algorithm. Importance of an input feature may be recognized, and a score of a corresponding segment is regressed by using marked training data (that is, a prepared video segment and a score of a corresponding brilliance degree are extracted). In the attention-based neural network, training data is used to train distribution of importance of different modals and regress a score of a segment. A trained model is stored in a corresponding device. During test and use, a feature of a corresponding video segment is extracted. The trained regression model automatically outputs a score of the segment, to recognize a brilliant video segment of the video.

Step 310: Input a brilliant video segment of the livestreaming video.

In addition, in this application, different algorithm configuration may be selected based on different scenarios and resources. For example, when a real-time requirement exists and computing resources are limited, a conventional feature extraction model such as MFCC may be used for audio feature extraction, a lightweight network such as Mobilenet may be used for video feature extraction, and a fast extraction manner such as Word2vec may be used for structured feature extraction.

However, in a background environment in which there is no high real-time requirement, a feature extraction manner based on a deep neural network may be used to extract the audio feature, the image feature, and the structured feature, to output a more accurate result.

In this application, in the video processing method, feature fusion is performed by extracting different features of a plurality of pieces of audio information, a plurality of pieces of video information, and a plurality of pieces of structured information, so that a brilliance degree of each video segment of a current video is scored by fusing the features, to finally accurately and quickly recognized a highlight video segment of the video. In the video processing method, global information of the video may be obtained by fusing a plurality of modal features, to accurately obtain the highlight video segment of the video. In addition, in the method, different algorithm configuration and deployment may be performed for different environments, to meet a requirement of a processing speed and accuracy.

Figure 4:
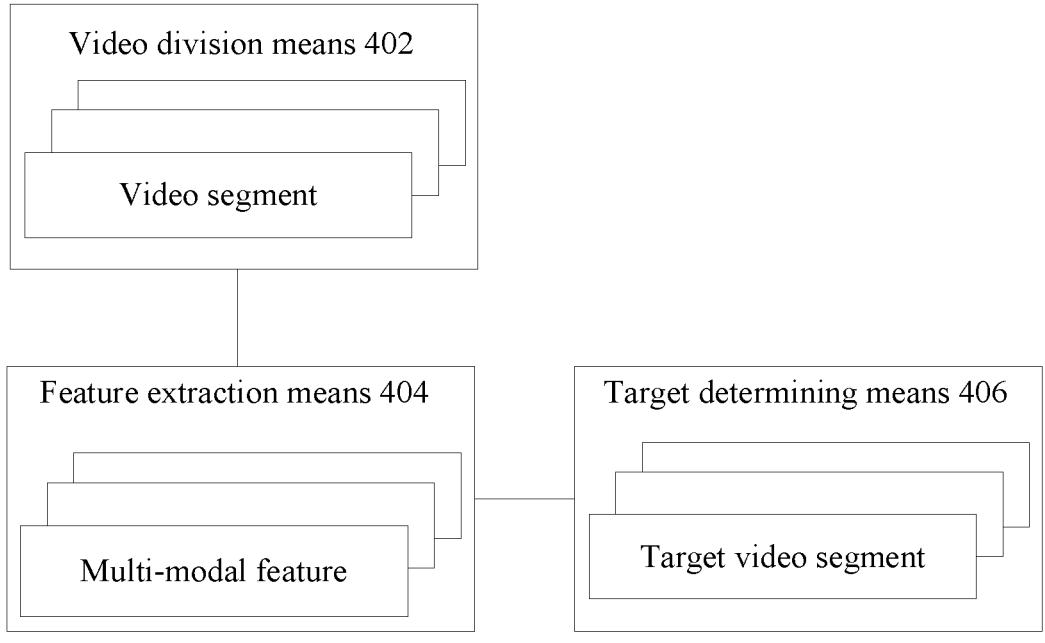
FIG. 4 is a schematic diagram of a structure of a video processing apparatus according to an embodiment of this application.

Corresponding to the method embodiments, this application further provides an embodiment of a video processing apparatus. FIG. 4 is a schematic diagram of a structure of a video processing apparatus according to an embodiment of this application. As shown in FIG. 4, the apparatus includes:

a video division means 402, configured to divide a received initial video into at least one video segment;

a feature extraction means 404, configured to obtain, based on a feature extraction model, a first modal feature, a second modal feature, and a third modal feature that correspond to each video segment in the at least one video segment; and a target determining means 406, configured to: input, into a recognition model, the first modal feature, the second modal feature, and the third modal feature that correspond to each video segment, to obtain a video score corresponding to each video segment, and determine a target video segment in the initial video based on the video score.

Optionally, the feature extraction means 404 is further configured to:

obtain, based on a first feature extraction model, an audio feature corresponding to each video segment in the at least one video segment;

obtain, based on a second feature extraction model, an image feature corresponding to each video segment in the at least one video segment; and obtain, based on a third feature extraction model, a structured feature corresponding to each video segment in the at least one video segment.

Optionally, the feature extraction means 404 is further configured to:

extract audio information of each video segment in the at least one video segment; and input the audio information of each video segment into the first feature extraction model to obtain the audio feature corresponding to each video segment.

Optionally, the feature extraction means 404 is further configured to:

extract image information of each video segment in the at least one video segment; and input the image information into the second feature extraction model to obtain the image feature corresponding to each video segment.

Optionally, the feature extraction means 404 is further configured to:

extract structured information of each video segment in the at least one video segment; and input the structured information into the third feature extraction model to obtain the structured feature corresponding to each video segment.

Optionally, the image information includes a video picture and a key area picture, and the second feature extraction model includes a first image feature extraction model and a second image feature extraction model.

Correspondingly, the feature extraction means 404 is further configured to:

input the video picture into the first image feature extraction model to obtain a video picture feature corresponding to each video segment;

input the key area picture into the second image feature extraction model to obtain a key area picture feature corresponding to each video segment; and fuse the video picture feature and the key area picture feature that correspond to each video segment to obtain the image feature corresponding to each video segment.

Optionally, the image information includes a video picture, a key area picture, and an online streamer image, and the second feature extraction model includes a first image feature extraction model, a second image feature extraction model, and a third image feature extraction model.

Correspondingly, the feature extraction means 404 is further configured to:

input the video picture into the first image feature extraction model to obtain a video picture feature corresponding to each video segment;

input the key area picture into the second image feature extraction model to obtain a key area picture feature corresponding to each video segment; and input the online streamer image into the third image feature extraction model to obtain an online streamer image feature corresponding to each video segment; and fuse the video picture feature, the key area picture feature, and the online streamer image feature that correspond to each video segment, to obtain the image feature corresponding to each video segment.

Optionally, the audio information includes audio information corresponding to a video picture and audio information corresponding to a non-video picture.

Correspondingly, the feature extraction means 404 is further configured to:

input the audio information corresponding to the video picture in each video segment into the first feature extraction model to obtain an audio feature corresponding to the video picture in each video segment;

input the audio information corresponding to the non-video picture in each video segment into the first feature extraction model to obtain an audio feature corresponding to the non-video picture in each video segment; and fuse the audio feature corresponding to the video picture in each video segment and the audio feature corresponding to the non-video picture in each video segment, to obtain the audio feature corresponding to each video segment.

Optionally, the target determining means 406 is further configured to:

determine, as the target video segment in the initial video, a video segment whose video score is greater than or equal to a preset score threshold.

Optionally, the apparatus further includes:

a target video generation means, configured to: generate a target video based on the target video segment, and send the target video to a user.

Optionally, the apparatus further includes:

a model determining means, configured to determine type information of the feature extraction model and/or the recognition model based on a scenario to which the video processing method is applied and/or a resource requirement of the video processing method.

In this application, the video processing apparatus fuses a first modal feature, a second modal feature, and a third modal feature of an obtained video, and when recognizing a highlight video segment of the video based on a multi-modal feature obtained through fusion, accurately obtains the highlight video segment of the video by using multi-modal and comprehensive feature information of the video. This improves user experience.

The foregoing describes a schematic solution of the video processing apparatus in this embodiment. It should be noted that the technical solution of the video processing apparatus and the technical solution of the video processing method belong to the same concept. For details not described in detail in the technical solution of the video processing apparatus, refer to the descriptions of the technical solution of the video processing method.

Figure 5:
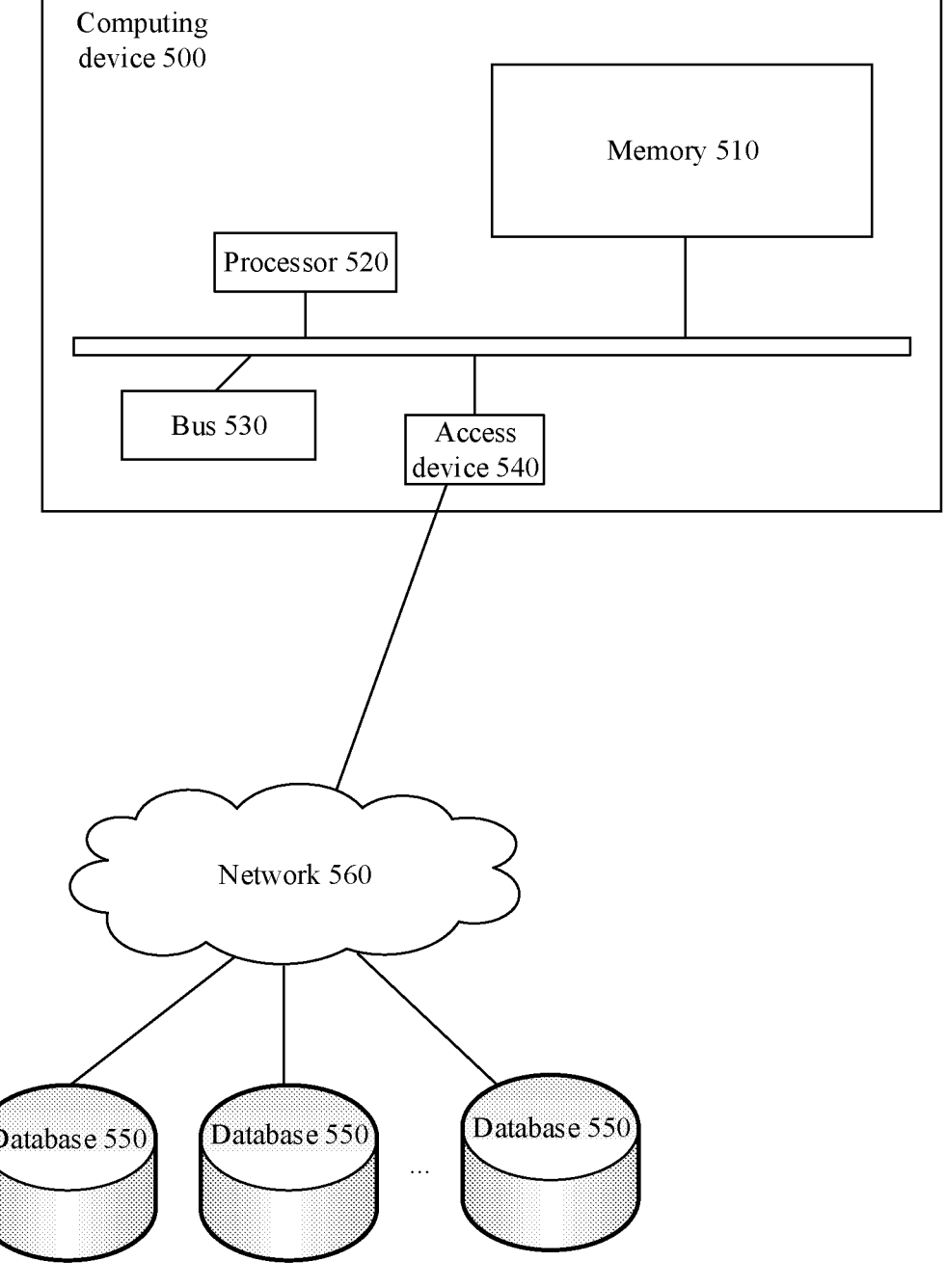
FIG. 5 is a block diagram of a structure of a computing device according to an embodiment of this application.

FIG. 5 is a block diagram of a structure of a computing device 500 according to an embodiment of this application. Components of the computing device 500 include but are not limited to a memory 510 and a processor 520. The processor 520 and the memory 510 are connected by using a bus 530, and a database 550 is configured to store data.

The computing device 500 further includes an access device 540, and the access device 540 enables the computing device 500 to perform communication by using one or more networks 560. Examples of these networks include a public switched telephone network (PSTN), a local area network (LAN), a wide area network (WAN), a private area network (PAN), or a combination of communication networks such as the Internet. The access device 540 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In an embodiment of this application, the foregoing components of the computing device 500 and other components not shown in FIG. 5 may be alternatively connected to each other, for example, by using the bus. It should be understood that the block diagram of the structure of the computing device shown in FIG. 5 is merely used as an example instead of a limitation on the scope of this application. A person skilled in the art may add or substitute other components as required.

The computing device 500 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a PC. The computing device 500 may be alternatively a mobile or still server.

The processor 520 is configured to execute the following computer executable instruction. When executing the instruction, the processor 520 implements steps of the video processing method.

The foregoing describes the schematic solution of the computing device in this embodiment. It should be noted that the technical solution of the computing device and the technical solution of the video processing method belong to the same concept. For detailed content not described in detail in the technical solution of the computing device, refer to the descriptions of the technical solution of the video processing method.

An embodiment of this application further provides a computer-readable storage medium, where the computer-readable storage medium stores computer instructions, and when the instructions are executed by a processor, steps of the video processing method are implemented.

The foregoing describes the schematic solution of the computer-readable storage medium in this embodiment. It should be noted that the technical solution of the storage medium and the technical solution of the video processing method belong to the same concept. For detailed content not described in detail in the technical solution of the storage medium, refer to the descriptions of the technical solution of the video processing method.

An embodiment of this application further provides a computer program product, where when the computer program product is executed in a computer, the computer is enabled to perform steps of the video processing method.

The foregoing describes the schematic solution of the computer program product in this embodiment. It should be noted that the technical solution of the computer program product and the technical solution of the video processing method belong to the same concept. For detailed content not described in detail in the technical solution of the computer program product, refer to the descriptions of the technical solution of the video processing method.

Specific embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, some intermediate forms, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this application are all exemplary embodiments, and the used actions and modules are not necessarily mandatory to this application.

In the foregoing embodiments, descriptions of the embodiments have respective focuses. For a part that is not described in detail in an embodiment, refer to related descriptions in another embodiment.

The exemplary embodiments of this application disclosed above are merely intended to help describe this application. In the optional embodiments, all details are not described in detail, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method, comprising:
dividing a received initial video into at least one video segment;
obtaining, based on a feature extraction model, a first modal feature, a second modal feature, and a third modal feature that correspond to each video segment in the at least one video segment, wherein the first modal feature is an audio feature, the second modal feature is an image feature, and the third modal feature is a structured feature, and wherein the obtaining, based on a feature extraction model, a first modal feature, a second modal feature, and a third modal feature that correspond to each video segment in the at least one video segment comprises:
extracting image information of each video segment in the at least one video segment, wherein the image information comprises a video picture and a key area picture;
inputting the video picture into a first image feature extraction model to obtain a video picture feature corresponding to each video segment;
inputting the key area picture into a second image feature extraction model to obtain a key area picture feature corresponding to each video segment; and
fusing the video picture feature and the key area picture feature that correspond to each video segment, to obtain the image feature corresponding to each video segment; and
inputting, into a recognition model, the first modal feature, the second modal feature, and the third modal feature that correspond to each video segment, to obtain a video score corresponding to each video segment, and determining a target video segment in the initial video based on the video score.

2. The method according to claim 1, wherein the obtaining, based on a feature extraction model, a first modal feature, a second modal feature, and a third modal feature that correspond to each video segment in the at least one video segment further comprises:
obtaining, based on a first feature extraction model, the audio feature corresponding to each video segment in the at least one video segment; and
obtaining, based on a third feature extraction model, the structured feature corresponding to each video segment in the at least one video segment.

3. The method according to claim 2, wherein the obtaining, based on a first feature extraction model, the audio feature corresponding to each video segment in the at least one video segment comprises:

extracting audio information of each video segment in the at least one video segment; and inputting the audio information of each video segment into the first feature extraction model to obtain the audio feature corresponding to each video segment.

4. The method according to claim 3, wherein the audio information comprises audio information corresponding to a video picture and audio information corresponding to a non-video picture; and wherein the inputting the audio information of each video segment into the first feature extraction model to obtain the audio feature corresponding to each video segment comprises:

inputting the audio information corresponding to the video picture in each video segment into the first feature extraction model to obtain an audio feature corresponding to the video picture in each video segment;

inputting the audio information corresponding to the non-video picture in each video segment into the first feature extraction model to obtain an audio feature corresponding to the non-video picture in each video segment; and fusing the audio feature corresponding to the video picture in each video segment and the audio feature corresponding to the non-video picture in each video segment, to obtain the audio feature corresponding to each video segment.

5. The method according to claim 2, wherein the obtaining, based on a third feature extraction model, the structured feature corresponding to each video segment in the at least one video segment comprises:

extracting structured information of each video segment in the at least one video segment; and inputting the structured information into the third feature extraction model to obtain the structured feature corresponding to each video segment.

6. The method according to claim 1, wherein the image information further comprises an online streamer image, and wherein the obtaining, based on a feature extraction model, a first modal feature, a second modal feature, and a third modal feature that correspond to each video segment in the at least one video segment further comprises:

inputting the online streamer image into a third image feature extraction model to obtain an online streamer image feature corresponding to each video segment; and wherein the fusing the video picture feature and the key area picture feature that correspond to each video segment, to obtain the image feature corresponding to each video segment comprises:

fusing the video picture feature, the key area picture feature, and the online streamer image feature that correspond to each video segment, to obtain the image feature corresponding to each video segment.

7. The method according to claim 1, wherein the determining a target video segment in the initial video based on the video score comprises:

determining, as the target video segment in the initial video, a video segment whose video score is greater than or equal to a preset score threshold.

8. The method according to claim 7, after the determining, as the target video segment in the initial video, a video segment whose video score is greater than or equal to a preset score threshold, further comprising:

generating a target video based on the target video segment, and sending the target video to a user.

9. The method according to claim 1, further comprising:

determining type information of the feature extraction model and/or the recognition model based on a scenario to which the method is applied and/or a resource requirement of the method.

10. A computing device, comprising a memory, a processor, and computer instructions stored in the memory and capable of running on the processor, wherein when executing the computer instructions, the processor perform operations comprising:

dividing a received initial video into at least one video segment;

obtaining, based on a feature extraction model, a first modal feature, a second modal feature, and a third modal feature that correspond to each video segment in the at least one video segment, wherein the first modal feature is an audio feature, the second modal feature is an image feature, and the third modal feature is a structured feature, and wherein the obtaining, based on a feature extraction model, a first modal feature, a second modal feature, and a third modal feature that correspond to each video segment in the at least one video segment comprises:

extracting image information of each video segment in the at least one video segment, wherein the image information comprises a video picture and a key area picture;

inputting the video picture into a first image feature extraction model to obtain a video picture feature corresponding to each video segment;

inputting the key area picture into a second image feature extraction model to obtain a key area picture feature corresponding to each video segment; and fusing the video picture feature and the key area picture feature that correspond to each video segment, to obtain the image feature corresponding to each video segment; and inputting, into a recognition model, the first modal feature, the second modal feature, and the third modal feature that correspond to each video segment, to obtain a video score corresponding to each video segment, and determining a target video segment in the initial video based on the video score.

11. The computing device according to claim 10, wherein the obtaining, based on a feature extraction model, a first modal feature, a second modal feature, and a third modal feature that correspond to each video segment in the at least one video segment further comprises:

obtaining, based on a first feature extraction model, the audio feature corresponding to each video segment in the at least one video segment; and obtaining, based on a third feature extraction model, the structured feature corresponding to each video segment in the at least one video segment.

12. The computing device according to claim 11, wherein the obtaining, based on a first feature extraction model, the audio feature corresponding to each video segment in the at least one video segment comprises:

extracting audio information of each video segment in the at least one video segment; and inputting the audio information of each video segment into the first feature extraction model to obtain the audio feature corresponding to each video segment.

13. The computing device according to claim 12, wherein the audio information comprises audio information corresponding to a video picture and audio information corresponding to a non-video picture; and wherein the inputting the audio information of each video segment into the first feature extraction model to obtain the audio feature corresponding to each video segment comprises:

inputting the audio information corresponding to the video picture in each video segment into the first feature extraction model to obtain an audio feature corresponding to the video picture in each video segment;

inputting the audio information corresponding to the non-video picture in each video segment into the first feature extraction model to obtain an audio feature corresponding to the non-video picture in each video segment; and fusing the audio feature corresponding to the video picture in each video segment and the audio feature corresponding to the non-video picture in each video segment, to obtain the audio feature corresponding to each video segment.

14. The computing device according to claim 11, wherein the obtaining, based on a third feature extraction model, the structured feature corresponding to each video segment in the at least one video segment comprises:

extracting structured information of each video segment in the at least one video segment; and inputting the structured information into the third feature extraction model to obtain the structured feature corresponding to each video segment.

15. The computing device according to claim 10, wherein the image information further comprises an online streamer image, and wherein the obtaining, based on a feature extraction model, a first modal feature, a second modal feature, and a third modal feature that correspond to each video segment in the at least one video segment further comprises:

inputting the online streamer image into a third image feature extraction model to obtain an online streamer image feature corresponding to each video segment; and wherein the fusing the video picture feature and the key area picture feature that correspond to each video segment, to obtain the image feature corresponding to each video segment comprises:

fusing the video picture feature, the key area picture feature, and the online streamer image feature that correspond to each video segment, to obtain the image feature corresponding to each video segment.

16. A non-transitory computer-readable storage medium, wherein the non-transitory computer-readable storage medium stores computer instructions, which when executed by a processor, cause the processor to perform operations comprising:

dividing a received initial video into at least one video segment;

obtaining, based on a feature extraction model, a first modal feature, a second modal feature, and a third modal feature that correspond to each video segment in the at least one video segment, wherein the first modal feature is an audio feature, the second modal feature is an image feature, and the third modal feature is a structured feature, and wherein the obtaining, based on a feature extraction model, a first modal feature, a second modal feature, and a third modal feature that correspond to each video segment in the at least one video segment comprises:

extracting image information of each video segment in the at least one video segment, wherein the image information comprises a video picture and a key area picture;

inputting the video picture into a first image feature extraction model to obtain a video picture feature corresponding to each video segment;

inputting the key area picture into a second image feature extraction model to obtain a key area picture feature corresponding to each video segment; and fusing the video picture feature and the key area picture feature that correspond to each video segment, to obtain the image feature corresponding to each video segment; and inputting, into a recognition model, the first modal feature, the second modal feature, and the third modal feature that correspond to each video segment, to obtain a video score corresponding to each video segment, and determining a target video segment in the initial video based on the video score.

* * * * *